United States Patent [19]
Hardy

[11] 3,970,227
[45] July 20, 1976

[54] SPRING LOOP KEY RING AND BELT ATTACHMENT

[76] Inventor: Gilbert F. Hardy, 8191 Sterling Ave., Huntington Beach, Calif. 92646

[22] Filed: Feb. 21, 1975

[21] Appl. No.: 551,900

[52] U.S. Cl. .................................. 224/5 R; 24/3 K; 24/237
[51] Int. Cl.² .......................................... A45F 5/02
[58] Field of Search ............ 224/5 R, 5 A, 7 D, 7 E, 224/26 R, 26 B; 24/3 K, 3 L, 236, 237, 161, 156 R; 16/87.2

[56] References Cited
UNITED STATES PATENTS

| | | | |
|---|---|---|---|
| 1,341,930 | 6/1920 | Roblin.................................. | 24/3 K |
| 1,974,856 | 9/1934 | White et al...................... | 24/3 K UX |
| 2,547,335 | 4/1951 | May.............................. | 224/7 A X |

FOREIGN PATENTS OR APPLICATIONS

| | | | |
|---|---|---|---|
| 219,580 | 7/1924 | United Kingdom................. | 224/5 A |

Primary Examiner—Robert J. Spar
Assistant Examiner—Jerold M. Forsberg
Attorney, Agent, or Firm—Wm. Jacquet Gribble

[57] ABSTRACT

A key keeper is held in a belt loop within a small closed bend thereof. The keeper has opposed small and large half loops. Straight side rods connect the loops, being tangent to both. One side rod is split to place keys on the keeper. A trough or clip fixed to a rod at the split releasably secures the rod in place. One loop is about twice the diameter of the other, the large half loop imparting resiliency to the keeper to reduce the need for expensive spring steel wire for the keeper. The keeper is made by winding a continuous wire on a mandrel wherein two end plates with pivots support a large and a small arbor. Each arbor has a cylindrical outer segment in contact with the wire. A clamping bar holds the wire in place after winding, insuring that the wire accepts the shape of the arbors. A cutter then severs the strands of wire on one side of the mandrel, separating the wound length into segments each having the configuration set forth above.

2 Claims, 8 Drawing Figures

U.S. Patent    July 20, 1976    3,970,227
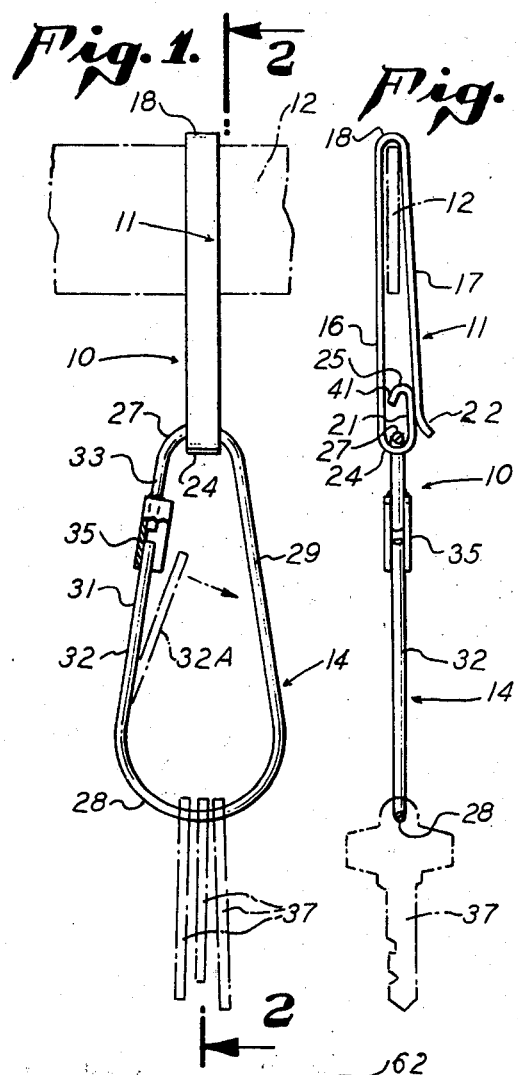
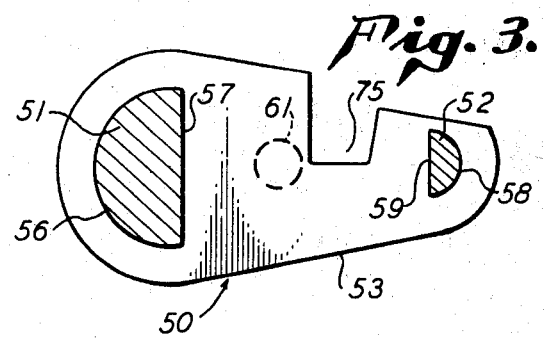
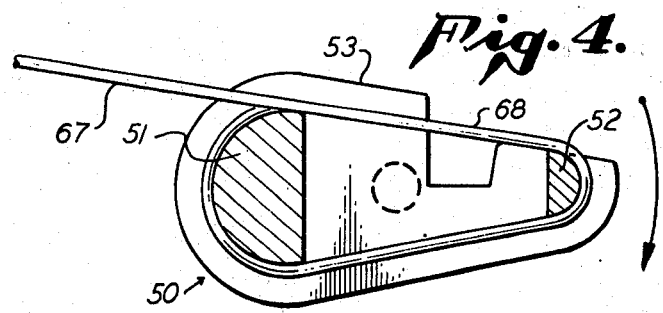
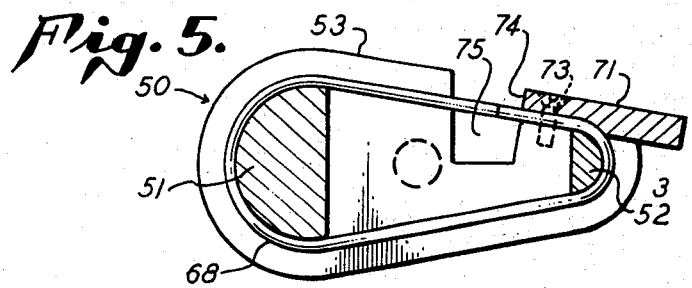
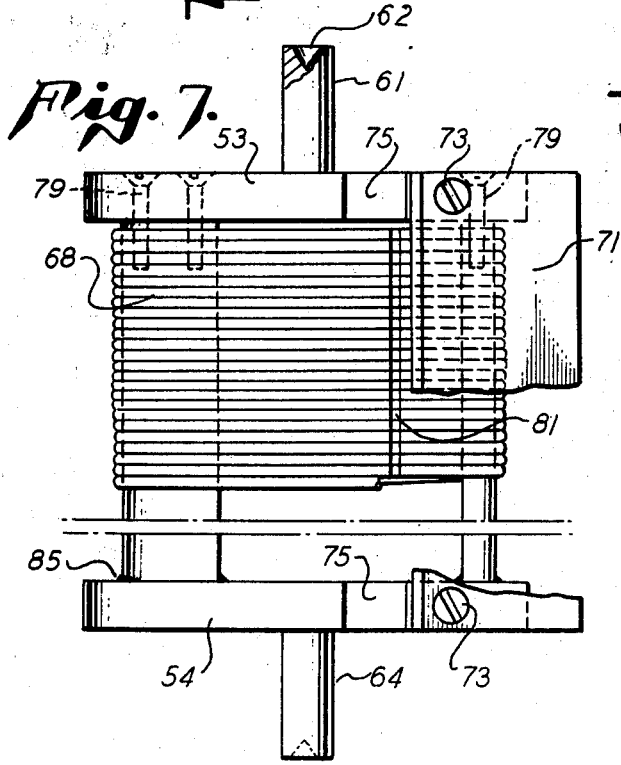
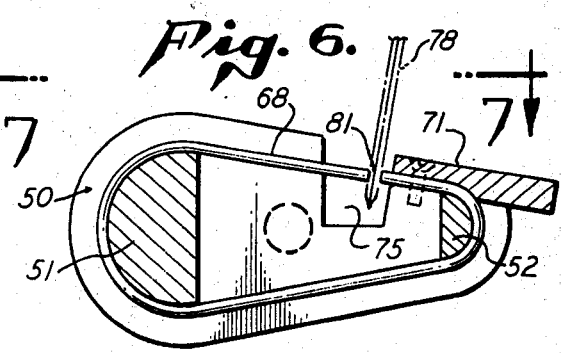
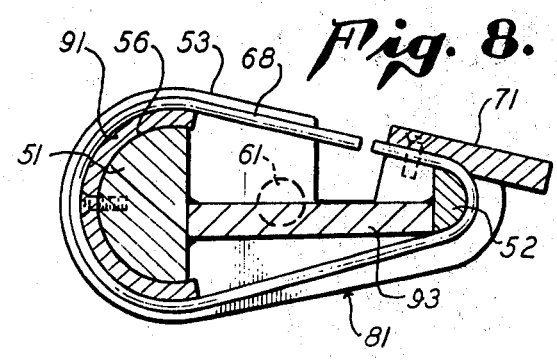

SPRING LOOP KEY RING AND BELT ATTACHMENT

BACKGROUND OF THE INVENTION

Loop keyholders are conventionally made of high quality spring wire in order to be resilient and strong. Also, many different latch devices have been tried to achieve security, both in keeping keys on the holder and in keeping the holder on the user. Some of these previous attempts and the general state of the art are obvious from the following listed U.S. Pat. Nos. resulting from a preliminary examination:

2,564,242 Wendt Aug. 14, 1951
2,823,537 Segal Feb. 18, 1958
2,871,691 Bacon Feb. 3, 1959
2,938,375 Wehrli May 31, 1960.

The present invention solves the problems of materials, safe keeping and efficient production not achieved by the prior art.

SUMMARY OF THE INVENTION

The invention contemplates a keyholder for use on a belt which comprises a belt hook with means to retain the hook on the belt and a key keeper secured by means on the belt hook with the key keeper having a large half loop adapted to receive keys and a small half loop spaced from the large half loop engaged with the belt hook. Straight side rods connect between the large and small keeper half loops. The second straight side rod is discontinuous and has attached thereto means for releasably securing the two portions of the discontinuous side rod. Preferably the straight side rods of the keeper are tangential to the half loops at each of their ends.

The inventive process for fabricating key keepers comprises the steps of winding a continuous wire length about a mandrel whether by turning the mandrel or revolving the wire length and bending the wire on the mandrel to impose alternating large and small half loops on the wire and locking the wound wire on the mandrel and then severing each segment of wire on one side of the mandrel between the large and small half loops.

The inventive apparatus for practicing the process comprises a semicylindrical first arbor spaced from a semicylindrical second arbor, means securing the first and second arbors in parallel relationship and pivot means on the securing means, the line of the pivots being parallel to the first and second arbors. A clamp bar is removably fixed to the securing means and extends the length of the arbors.

In a preferred embodiment of the apparatus a semi-annular sleeve and means for securing said sleeve to the cylindrical surface of one of the arbors may combine to change the effective diameter thereof. Preferably the first arbor has a diameter twice the diameter of the second arbor, such that the resultant key keeper has a large half loop and a small half loop.

The process and apparatus result in a keyholder wherein the belt hook is easily adapted to placement on the belt of a user with the belt hook oriented in either direction with respect to the body of the user to best preclude removal of the key keeper. The key keeper may be fabricated from relatively inexpensive spring steel wire because of the relationship of the large and small loops, the large loop not only holding a large number of keys but affording resiliency to the locking limb of the key keeper, diminishing the need for high-quality spring steel for effective repetitive locking and unlocking of the key keeper without metal fatigue.

These and other advantages of the invention and process and apparatus for fabrication are apparent from the following detailed description and drawing.

BRIEF DESCRIPTION OF THE DRAWING

FIG. 1 is an elevational front view of a key holder in accordance with the invention secured to the belt of a user;

FIG. 2 is a side elevation, partly in section, of the embodiment of FIG. 1 taken along line 2—2 of FIG. 1;

FIG. 3 illustrates in schematic transverse section the apparatus for practicing the process of the invention;

FIG. 4 is a transverse section similar to FIG. 3 showing the practice of the process;

FIGS. 5 and 6 are transverse sections similar to FIG. 3 showing further steps of the process;

FIG. 7 is a fragmentary plan view taken along line 7—7 of FIG. 6; and

FIG. 8 is a transverse sectional view similar to FIG. 3 of an alternate embodiment of the apparatus for practicing the process.

In the various Figures like parts are referred to by like reference characters.

DESCRIPTION OF THE PREFERRED EMBODIMENTS

FIGS. 1 and 2 illustrate a key holder assembly 10 comprised of a belt hook 11 shown on a schematically represented belt 12 and a key keeper 14 secured to and depending from the belt hook. As can be seen from FIG. 1, the belt hook is a flat strap having spaced legs 16 and 17 joined by a shallow bend 18. Leg 16 terminates away from the shallow bend in a flat loop 21 and leg 17 terminates in an out-turned lip 22.

The flat loop has an outer bend 24 and an inner bend 25. The base of lip 22 bears against the flat loop. The belt hook is either slipped over an end of an unfastened belt of a user or passed over a fastened belt by separating the flat loop and lip 22 and passing the hook over the belt. The side elevation of FIG. 2 shows the feasibility of orienting the hook either with the lip 22 inward toward the user or outwardly away from the user, the latter orientation being preferable to confound surreptitious removal of the belt hook from the user's belt.

The keeper 14 has a small half loop 27 and a large half loop 28. The small half loop is lodged within the flat loop 21 of the belt hook. First and second side rods 29, 31 connect between the small and large half loops, with side rod 31 being discontinuous, having an articulate limb 32 attached to large loop 28 and a stub 33 attached to small loop 27.

Stub side rod 33 has spot welded or otherwise secured to its free end a metallic trough 35 which opens inwardly toward the opposite keeper side rod 29. As can be seen from FIG. 1, limb 32 may be pressed inwardly to the dotted position 32A and thus be removed from trough 35 such that the keys 37 shown in phantom lines in FIGS. 1 and 2 may be removed from the keeper by traversing the disconnected limb 32.

The keeper may be assembled with the hook either by passing the small loop upwardly between lip 22 and the flat loop 21 and downwardly within the flat loop past loop end 41 or by disconnecting limb 32 prior to placing keys on the keeper and threading the large loop and side rod 29 through the flat loop until the small loop is engaged therewith.

Preferably the keeper is of a mild spring steel wire of 0.125-inch diameter which is susceptible to spot welding attachment of the stamped metal trough 35. Because the large loop imparts added resilience to the limb, the steel need not be of a high quality, thereby lowering the initial stock cost and the energy needed to form the steel into the desired shape.

FIGS. 3–7 illustrate the apparatus and the process for fabricating the keeper of the invention, FIG. 3 showing in transverse section a mandrel 50 with a first semicylindrical arbor 51 spaced from a second semicylindrical arbor 52. The arbors extend between spaced end plates, such as the end plate 53, whose counterpart end plate 54 is shown in FIG. 7. Each of the arbors has a curved surface and a flat surface. Arbor 51 has a curved surface 56 and a flat surface 57. Arbor 52 has a curved surface 58 and a flat surface 59. The flat surfaces are less than the full diameter of the arbor, being spaced from the true diameter such that the path of the wire, as shown in FIG. 4, is tangential to the curving surfaces of both arbors. FIG. 3 shows in dotted lines one pivot 61 of two pivots, both of which may have end countersinks 62 (see FIG. 7) such that the mandrel may be chucked at one end and suspended by a tailstock in the other. FIG. 7 shows the opposite pivot 64 of the mandrel 50 of FIG. 3.

While the wire may be wound by conventional means about the mandrel, it is preferred, as shown in FIG. 4, that the mandrel be turned and the supply end 67 of a wire 68 be static such that the wire is wound about the mandrel, as shown in FIG. 7. It has been found that approximately 570 keeper pieces may be wound on a 72-inch mandrel. After the wire is wound on the two arbors such that the side rods of each loop are tangential to the semicylindrical arbors, a clamp and guide piece 71 is secured between the end plates. Conventional screws, such as the screw 73, may be used at each end to secure the clamp and the guide in place. The clamp extends across the wire, turns on the mandrel, and has an elongate edge 74 adjacent the clearance slots 75 which are in each end plate 53, 54.

As can be seen from FIG. 6, an abrasive saw, the blade 78 of which is shown in broken lines, is supported on the clamp and guide 71 and made to traverse the length of the mandrel, severing the wire loops along the line 81 of FIGS. 6 and 7. The severance step of the process has two functions: it separates the continuously wound wire 68 on the mandrel into individual pieces having a large half loop and a small half loop with a discontinuous side rod for the key keeper of the invention and permits their individual removal from the mandrel once one end plate, such as the plate 53, is removed. Preferably the plates are secured by screw 79 threadably engaged with the arbors 51 and 52. The other end of each arbor may be welded as at 85 to the end plate 54. It is obvious that the clamp and guide bar 71 must be removed before the end plates can be separated.

After the removal of the now segmented keeper loops, the metal trough 35 which acts as a retainer for the free limb 32 of the keeper may be attached as by spot welding to complete the assembly of the keeper. The belt hook and the keeper may be plated, dipped, sprayed or otherwise coated or clad for desired color or texture.

In FIG. 8 an alternate embodiment of the apparatus for the practice of the process is illustrated in cross-section. In that embodiment a mandrel 81 similar in most respects to the previously described mandrel 50 has a semiannular sleeve 91 bolted to the curving surface 56 of first arbor 51, thus increasing the circumference and diameter of the larger loop of the wire 68 wound on the mandrel. By utilizing a series of sleeves 91 of differing thicknesses varying diametral proportions between the small and large half loops may be attained.

In addition, a spacer web 93 is shown in the embodiment of FIG. 8, fixed between the two arbors. While the web is shown in conjunction with end plates, such as the plate 53 in that Figure, the end plates may be dispensed with if the pivots 61, 64 thereof are attached directly to the web, and the clamp and guide plate 71 is secured to the second arbor 52.

The foregoing specification with its illustrative embodiments is for the purpose of explaining the invention. Other variations within the scope of the invention will occur to those skilled in this particular art. It is therefore desired that the invention be measured by the appended claims rather than by the purely illustrative disclosure above.

I claim:

1. A key holder for use on a belt and comprising a belt hook formed by a pair of spaced flat legs joined by a shallow bend and adapted to retain the hook on the belt; a key keeper having a large half loop adapted to receive keys, a small half loop spaced from the large loop and engageable with the belt hook, a straight first keeper side rod connecting between said large and small keeper half loops, a discontinuous straight second keeper side rod connecting between the said large and small keeper half loops, and securing means for releasably securing together the discontinuous straight second keeper side rod, said securing means being fixedly attached to a portion of the discontinuous side near the small loop and further precluding passage of keys from the small loop at one end thereof; and means on the belt hook for retaining a key keeper including a flat loop extending from one spaced flat leg, a flat loop end bearing resiliently against said one spaced flat leg, and a flat leg extension on the other flat leg in contact with the outer surface of the loop and extending away from the shallow bend beyond the flat loop, whereby said key keeper is retained by said flat loop and said legs are resilient so as to spring apart to separate the flat loop and the leg for the insertion of a belt therebetween.

2. A key holder in accordance with claim 1 wherein each of the first and second keeper side rods join the small and large half loops substantially at tangent points to both loops.

* * * * *